United States Patent [19]

Sheinkop et al.

[11] Patent Number: 4,741,753
[45] Date of Patent: May 3, 1988

[54] METHOD AND APPARATUS FOR ELECTRICALLY HEATING MOLTEN GLASS

[75] Inventors: Isac M. Sheinkop; Manoj K. Choudhary, both of Reynoldsburg, Ohio

[73] Assignee: Owens-Corning Fiberglas Corporation, Toledo, Ohio

[21] Appl. No.: 24,956

[22] Filed: Mar. 12, 1987

[51] Int. Cl.⁴ .............................................. C03B 5/235
[52] U.S. Cl. ........................................ 65/136; 65/337; 65/DIG. 4; 373/41
[58] Field of Search ................. 65/134, 135, 136, 337, 65/DIG. 4; 373/41

[56] References Cited

U.S. PATENT DOCUMENTS

| | | | |
|---|---|---|---|
| 3,741,742 | 6/1973 | Jennings | 65/135 |
| 3,818,112 | 6/1974 | Clishem | 65/DIG. 4 |
| 3,836,689 | 9/1974 | Holler et al. | 65/DIG. 4 |
| 3,842,180 | 10/1974 | Froberg et al. | 65/DIG. 4 |
| 4,599,100 | 7/1986 | Demarest | 65/134 |

Primary Examiner—Robert L. Lindsay
Attorney, Agent, or Firm—Patrick P. Pacella; Ronald E. Champion

[57] ABSTRACT

A method and apparatus for continuously melting and refining molten glass are disclosed which comprises the steps of applying a preponderance of heat to a molten glass mass by Joule effect heating and pulsating a portion of the heat applied to the molten glass mass such that the temperature of the surface molten glass is increased and the temperature of the molten glass being withdrawn is reduced and the total energy supplied to the furnace is reduced. An electric circuit means comprising at least two interconnected electrodes is pulsated on and off at predetermined time intervals in order to establish the desired temperature profile within the molten glass mass.

10 Claims, 5 Drawing Sheets

METHOD AND APPARATUS FOR ELECTRICALLY HEATING MOLTEN GLASS

BACKGROUND OF THE INVENTION

This invention relates to glass manufacturing and more particularly to an improved method and apparatus for melting glass. In particular, this invention relates to an improved method and apparatus for heating molten glass and the like through the Joule effect which includes zone temperature control and pulsing of an electrical energy through the temperature control zone.

Typically, glass is generally made by melting a batch of raw glass materials in a furnace. The furnace may be heated by a fossil fuel burner, by electricity, or by a combination of burner and electricity as described in the U.S. Pat. No. 3,885,945 to Rees, deceased et al. Electrically heated glass furnaces include a melting chamber or tank for holding a batch-molten glass body. Two or more electrodes are submerged in the molten glass for heating the glass by the Joule effect when electric voltage is applied between the electrodes. Raw glass batch supplied to the tank floats on the surface of the molten glass and is melted. The batch acts as an insulator both for heat and electricity. Heat losses at the bottom and side walls of the furnace tend to produce a temperature profile through the glass in the vertical plane which peaks nearer the upper surface of the melt than the bottom. Molten glass has a negative temperature coefficient of resistance, hence the molten glass tends to have a lower resistance in upper regions of the melt. Electric current magnitudes are greater in the low resistance molten glass in the upper portion of the melt, thus causing the greatest heat to be developed in these portions. The molten glass is removed from the tank in a region remote from the batch, usually at a submerged throat located in the bottom of the tank.

It is desirable to maintain the temperature of the molten glass at predetermined levels as the molten glass flows through the furnace. If glass on one side of the furnace becomes too hot, the lower viscosity of the glass causes channelization and non uniform glass may be discharged from the furnace. If a "hot spot" in the furnace becomes too intense, the glass may blister and seed. Also, the "hot spot" affects the temperature profile in the flow direction of the molten glass.

It is also desirable that the molten glass be somewhat cooler as it flows from the furnace. Maintenance of a specific output temperature is necessary in order to obtain the desired viscosity in the glass flowing from the furnace. The output temperature, and also the viscosity of the molten glass, is effected by a "hot spot" at an upstream located in the furnace.

The temperature stability problem in electrically heating molten glass was recognized in U.S. Pat. No. 3,836,689 to Holler et al. In this patent a plurality of control thermal zones were established transverse to the direction of glass flow through the furnace. For each thermal zone electrical circuits supplied power to submerged electrodes heating the glass. A control circuit was provided to maintain constant the square of the average current in the circuit. If a predetermined permissible temperature variation was exceeded in the molten glass in any thermal zone, power to all electrodes for such thermal zone was either reduced or interrupted. The thermal zones could also be interdependent in order to maintain a desired temperature profile in the glass flow direction. Such furnace requires great amounts of both fossil fuel and electrical energy.

Accordingly, it is a preferred object of the present invention to improve the method and apparatus for continuously melting glass. Another object is to provide an improved method for increasing heat recovery and heat utilization efficiency in glass melting furnaces.

Another object is to provide an improved method for electrically heating molten glass by the Joule effect.

Other objects and advantages of the invention will become apparent from the following detailed description with reference being made to the accompanying drawings.

SUMMARY OF THE INVENTION

In accordance with the above, the present invention relates to an improved method and apparatus wherein the preponderance of the heat energy for melting and refining glass is supplied by the electrical Joule effect heating wherein a batch blanket is floated over a major portion of the furnace tank. Batch material fed at or in the region of the furnace walls and the flow characteristics of the batch on a molten mass allow the batch to spread a blanket across most of the molten glass.

Electrical heat energy is applied to the molten glass to produce the batch blanket having its greatest thickness in the region where the batch is fed into the furnace tank. The blanket progressively thins towards the region of withdrawal of the molten glass. The furnace includes controls which regulate the electrical power supplied for heating the glass in order to reduce the hazard of hot or cold spots in the molten glass. Submerged within the molten glass are a plurality of electrodes which are arranged in rows extending transverse to the direction of flow of the molten glass. Each electrode row defines a separate thermal zone where electric power is supplied to the electrodes for heating the glass. The glass temperatures at a plurality of locations within each thermal zone are monitored and compared to each other. A feature of the invention involves pulsating the electrical power supplied to at least two electrodes for predetermined periods of time. In a preferred embodiment the electrodes nearest the throat region where the molten glass exits the tank are pulsated on and off alternatively; for example, 6 seconds on and 3 seconds off. The pulsing of electrical power results in a reduction in temperature of the molten glass being removed from the furnace tank at the throat region.

Further, such pulsating of electrical power results in an improvement in the glass consistency being removed from the furnace. As a consequence, there is a reduction in energy consumption needed in order to maintain the desired temperature levels within the furnace.

DESCRIPTION OF THE PREFERRED EMBODIMENT

Figure 1:
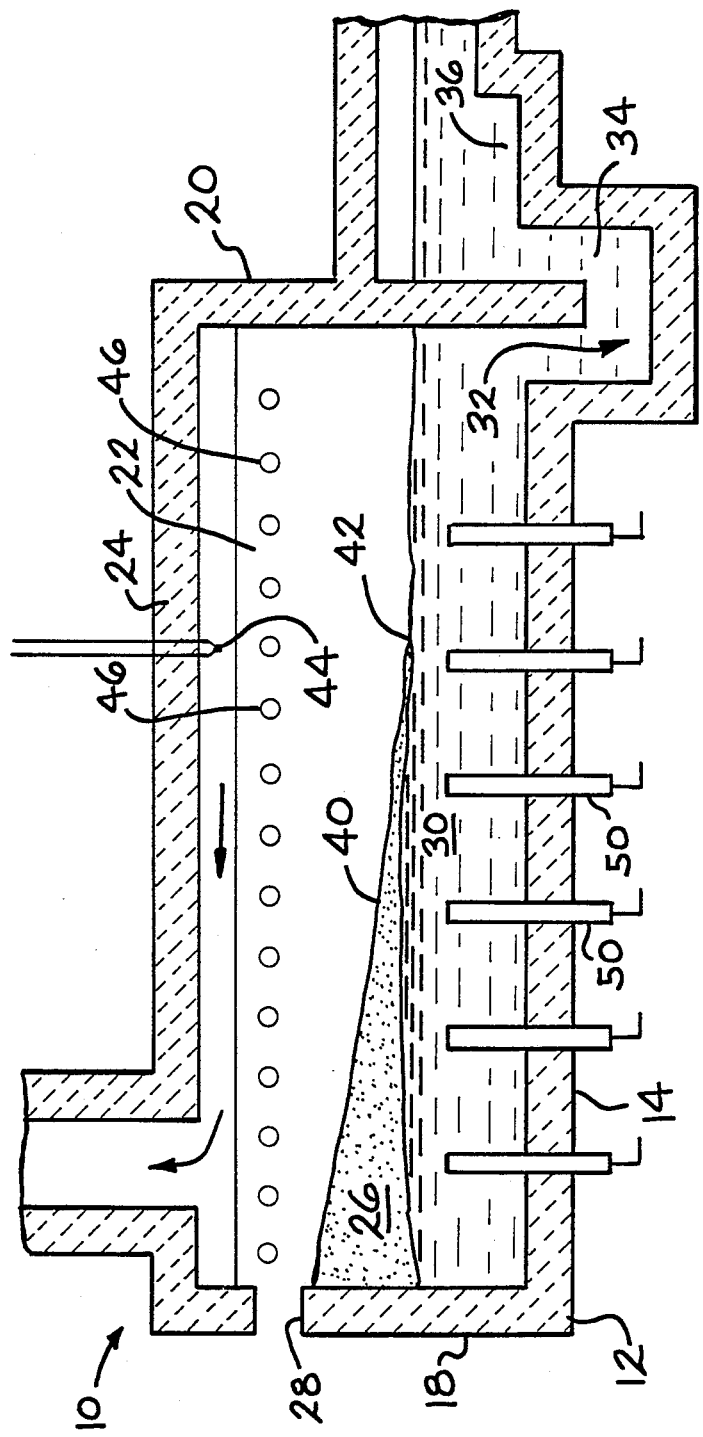
FIG. 1 is a schematic vertical longitudinal section of a continuous glass furnace illustrating the batch form and gas flow patterns experienced in such furnace.
Figure 3:
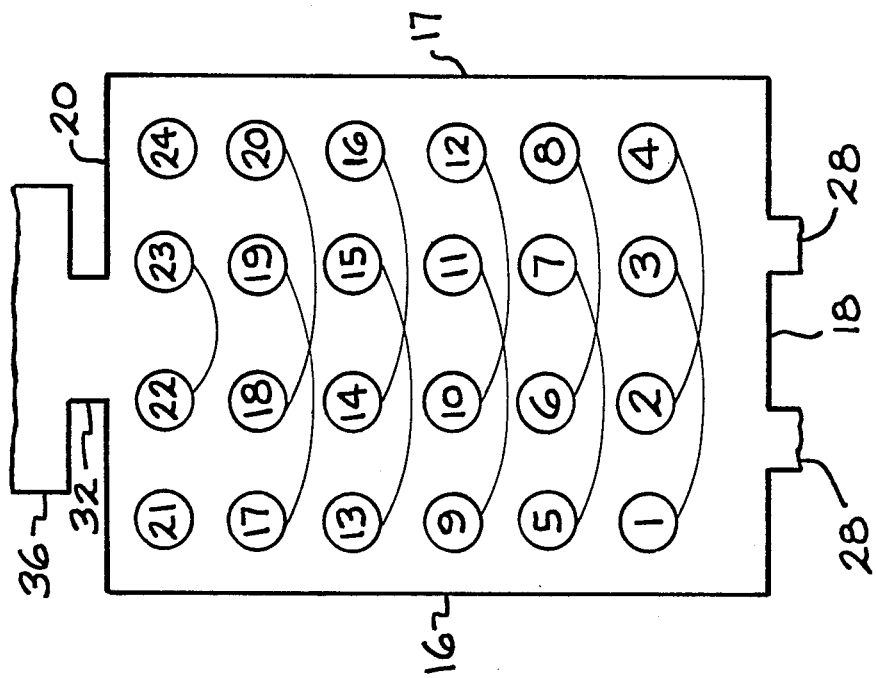
FIG. 3 is a diagrammatic plan view of a modified embodiment of an electric furnace for heating molten glass.
Figure 2:
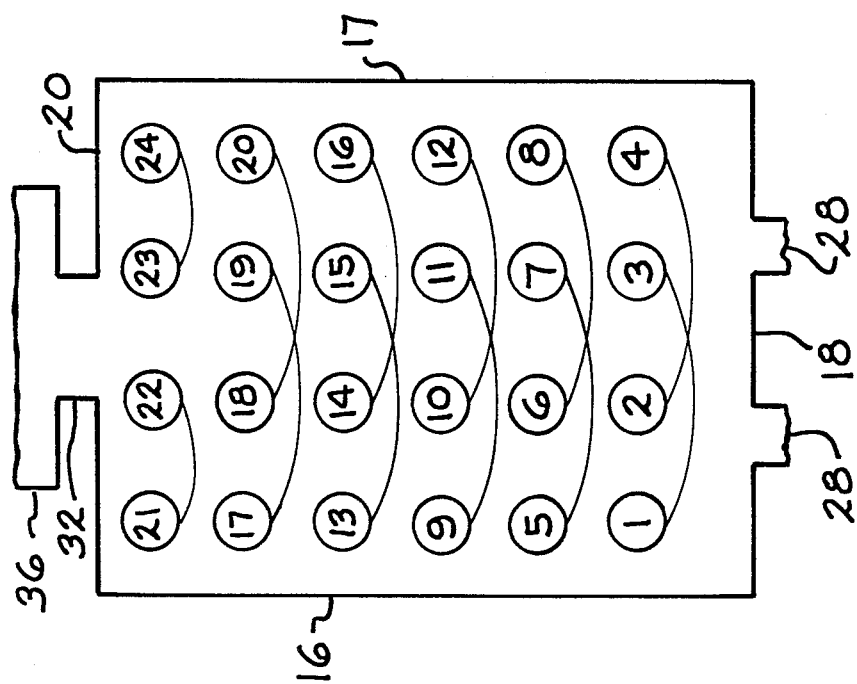
FIG. 2 is a diagrammatic plan view of one embodiment of an electric furance for heating molten glass.

A furnace 10 for melting glass as shown in FIGS. 1–3, includes a tank 12 having a bottom wall 14, side walls 16 and 17, a rear wall 18 and a front wall 20. Breast walls 22 support an arched roof 24 which forms a closed environment above the contents of the tank. Batch material 26 is fed through openings 28 in the rear wall 18. The batch floats on a molten glass mass 30.

The molten glass is withdrawn from the tank 12 through a throat 32 located at the front wall 20. The molten glass flows along a channel 36 to a forehearth area (not shown). The molten glass is withdrawn from the forehearth and utilized in forming the desired product, such as drawn and spun glass fibers (not shown). The front wall 20 extends downwardly into the molten glass flowing through the throat 32 to an up-well 34 and acts to prevent passage of batch material on the upper surface of the molten glass mass 30 from passing into the channel 36.

In operation, cool batch material 26 is introduced into the furnace 10 as the molten glass mass 30 is withdrawn in order to maintain a relatively constant level of glass constituents within the furnace 10. The batch 26 floats on the molten glass mass 30 as a blanket 40. The blanket 40 is thickest in the region adjacent the openings 28 and thins out at a leading edge 42. It is to be appreciated that batch material can be introduced from other locations than as shown in FIG. 1; for example, the batch can be introduced from side walls near the rear wall (not shown).

In the arrangement shown, heat is supplied from above the molten glass from radiant heat sources such as fossil fuel burners 46 located in the breast wall 22 of the furnace 10.

The majority of the heating of the molten glass mass occurs by the Joule effect as electrical current is passed between a plurality of electrodes 50. In the embodiment shown, the furnace 10 employs six rows of electrodes spaced longitudinally of the furnace. The electrical power is applied from transformers (not shown) and passes from one electrode to an associated electrode, as seen in FIGS. 2 and 3. For ease of explanation the electrodes have been numbered from 1–24. However, it is contemplated that other arrangements of electrodes can be utilized with the present invention. In the embodiments shown the electrodes E1–20 are associated as follows: E1–3, E2–4, E5–7, E6–8, etc.

The molten glass mass 30 within the furnace 10 continuously flows from the region adjacent the rear wall 18 to the throat 32. The electrical power supplied to the rows of electrodes 50 establishes a plurality of thermal zones within the furnace, which zones extend in a direction transverse to the direction of flow of the molten glass mass 30 through the furnace tank 12.

Referring to FIG. 3, the electrical power supplied to electrodes E22 and E23 is alternatively pulsated on and off, while no electrical power is supplied to the electrodes E21 and E24. In a preferred operation, the power is supplied to the electrodes E22–23 for approximately 6 seconds and off for approximately 3 seconds. The pulsating of electrical power to the electrodes E22–23 effectively redistributes or controls the important convection currents within the molten glass mass. Further, the pulsing of electrodes E22 and E23 act to control the temperature distribution within the molten glass mass 30.

Figure 4:
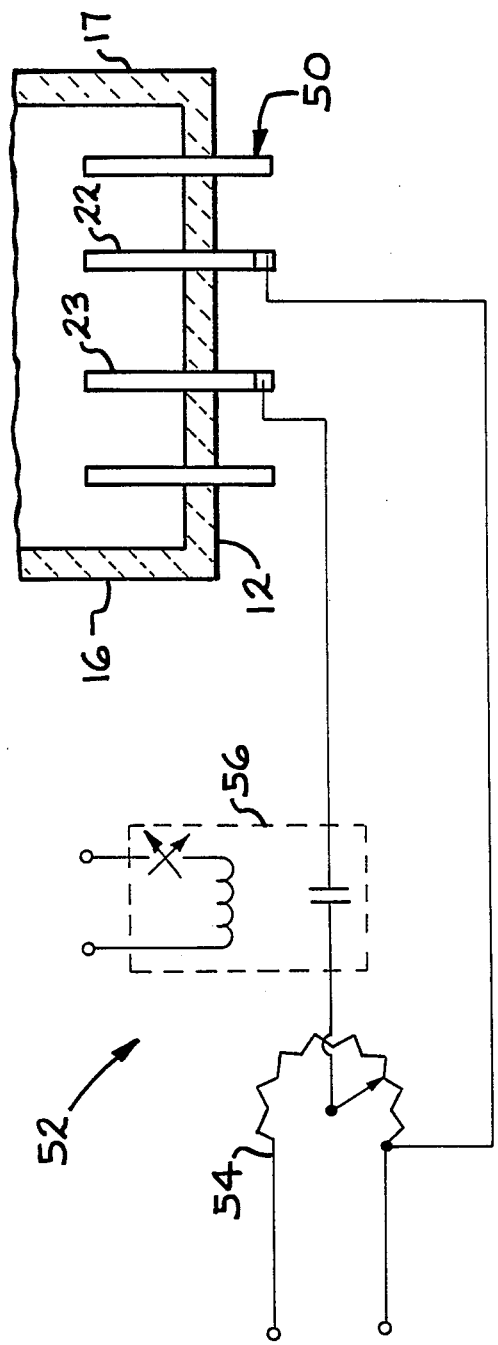
FIG. 4 is a schematic block diagram of the simplest possible power control circuit for use with the electric furnace of FIG. 3.

Referring now to FIG. 4, a circuit 52 for controlling the pulsing of the electrodes E22 and E23 is shown. The electrodes E22–23 are connected to an auto transformer 54 and a time relay 56 for use in pulsating the electrodes at predetermined intervals of time. It should be understood that other circuits and/or timing devices may be used without limiting the scope of this invention.

Various patterns of applying pulsating energy between various electrodes were evaluated. First, a pulse firing trial was conducted on the front row of the electrodes. Table I shows electrode positions and the firing patterns evaluated. On the row adjacent the throat 32, the power to electrodes E22 and E23 was pulsated on and off. This firing pattern resulted in lower throat temperatures than firing the alternating electrodes E21 to E22 and E23 to E24.

For the second pulse firing trial the front regulators (not shown) were recabled to pulse fire E22 to E23 and leave E21 and E24 unfired. Similarly, in the same trial the second row of electrodes E17–E20 were re-cabled so that the power between electrodes E18 and E19 was pulsed as well. The pulse rate was approximately 6 seconds on at 450 kilowatts and 3 seconds off, giving the average of 300 kw, which average was approximately equal to the total kwh normally supplied to the row of electrodes E21–23 and E22–24. This firing pattern resulted in moving the leading edge 42 of the batch material 26 toward the rear wall. This allows a greater area of molten glass, or glass without a batch blanket, to be exposed to the radiant heat from the fossil burners. The radiant heat from the fossil burners penetrates the molten glass more efficiently. This also presents a hotter glass surface to a fossil fuel control thermocouple 44, as shown in FIG. 1, which reduces the amount of fossil fuel supplied to the furnace. Further, the temperature of the glass moving through the forehearth was lower. Further, the pulse firing trials demonstrate that not only can the electrical power be reduced, but also the energy from the fossil fuel was reduced. As can be readily seen in Table I, the power requirements are greatly reduced both for fossil fuel and the amount of electrical energy required when the power to electrodes is pulsed, as described in this invention.

Figure 5:
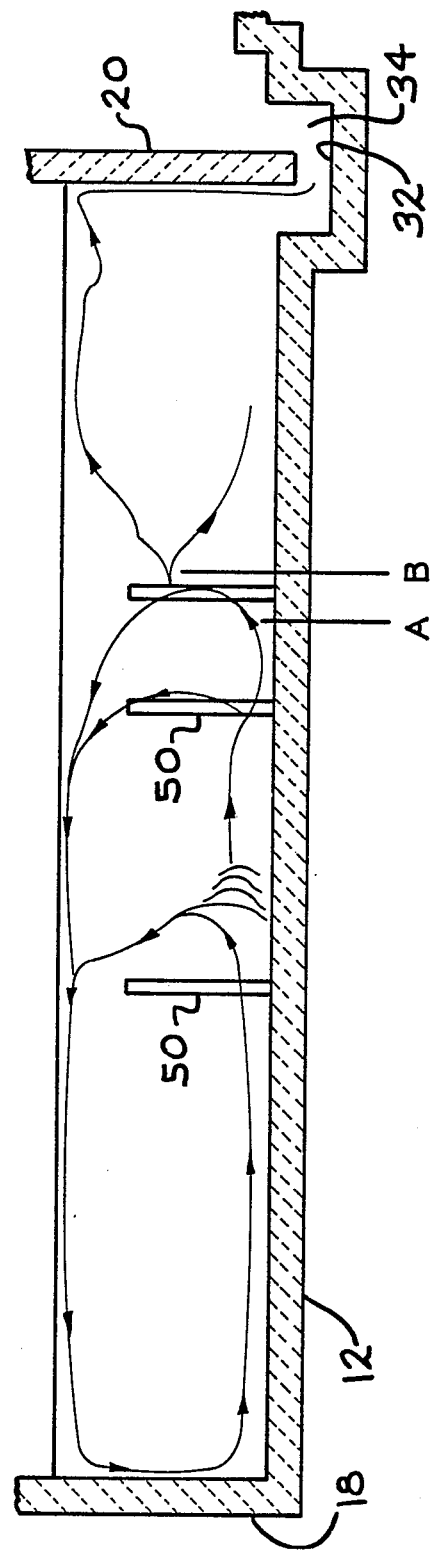
FIG. 5 is a schematic vertical longitudinal section of a prior art continuous glass furnace illustrating the molten glass flow patterns experienced in such furnace.
Figure 6:
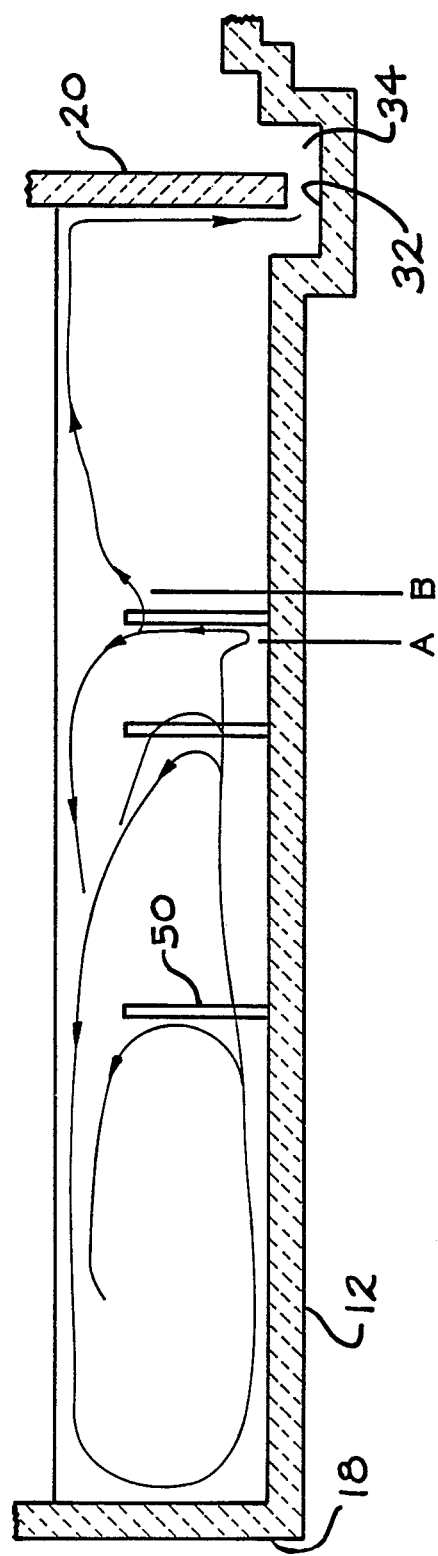
FIG. 6 is a schematic vertical longitudinal section of the continuous glass furnace illustrating the molten glass flow patterns experienced in this invention when applied to a furnace such as shown in FIG. 5.

Referring now to FIG. 5, the molten glass flow patterns are shown for a physical model of a furnace where the electrodes E21–23 and E22–24 are continuously operated. As can be seen by the arrows in FIG. 5, the "molten glass mass" took approximately seven minutes to travel from point A to point B. Further, the arrows indicate the general flow of the "molten glass mass" through the furnace during the standard interleaf firing with no pulsing of any electrodes. In contrast, FIG. 6 shows the flow of the "molten glass mass" through the same physical model of the furnace when the electrical energy between the front electrodes was pulsed. The "molten glass mass" takes approximately thirty-three minutes to flow from point A to point B. Further, the temperature of the "molten glass mass" exiting the tank is significantly lower when pulse firing principles were applied.

When pulsing of the electrodes is discontinued and continuous power is resumed the conditions within the furnace rapidly deteriorate, and forehearth temperature increased.

Efficiency of the furnace operation is enhanced by applying pulsating energy to at least two electrodes adjacent the glass exiting region. Such pulsing of electrical energy improves the forehearth temperature distribution. This is especially important, for example, in heating molten glass which is to be used for forming glass fibers since the viscosity of the glass leaving the furnace is critical. The glass viscosity is affected by the temperature history of the heated glass. The temperature of the molten glass mass is usually lowered in a final thermal zone near the glass exiting region or throat 32. The actual outlet temperature depends upon the actual composition of the glass and must generally be accurately controlled for establishing viscosity of the glass needed for subsequent forming operations.

The above-described method lends itself to many additions, variations and alteration without departing from the spirit or scope of this invention. Accordingly, it is to be appreciated that the detailed disclosure is to be read as illustrative of the invention and not in the limiting sense.

TABLE I

| TRIAL | #1 | #2 | #3 |
|---|---|---|---|
| Firing pattern of electrodes | 21 22 23 24<br>17 18 19 20 | 21 22 23 24<br>17 18 19 20 | 21 22 23 24<br>17 18 19 20 |
| Pulsed | No | Yes | Yes |
| Length of trial | 25 days | 5 days | 2 days |
| Type of fuel | #2 oil | #6 oil | #6 oil |
| Pull (ton/day) | 138 | 146 | 147.2 |
| Elec. Energy (KW) | 3400 | 3200 | 3350 |
| Amt of fossil fuel gal/hr | 110.1 | 101. | 104.6 |
| Elec. Energy (KW)/Ton of glass | 591 | 526 | 546 |
| Fossil fuel (gal)/Ton of glass | 19.1 | 16.6 | 17.0 |
| % Reduction of Elec. Energy/Ton of Glass | ±0.0 | −10.9% | −3.7% |
| % Reduction of Fossil Fuel/Ton of Glass | ±0.0 | −13.0% | −17.5% |

We claim:

1. A method of continuously melting and refining molten glass in a furnace comprising the steps of:
    applying a preponderance of heat to a molten glass mass by Joule effect heating; and,
    pulsating a portion of the heat applied to the molten glass mass in a thermal zone located adjacent a glass exiting region of the furnace such that the temperature of the molten glass surface is increased and the temperature of the molten glass being withdrawn from the furnace is reduced and the total energy supplied to the furnace is reduced.

2. The method according to claim 1 in which the heat applied to the molten glass mass by Joule effect heating defines at least one thermal zone extending within the molten glass mass, which thermal zone extends in a direction transverse to the molten glass mass flow direction.

3. The method according to claim 1 in which additional heat is applied to a region above the molten glass mass by a heating means such that the heat is sufficient to assist in heating the molten glass.

4. The method according to claim 1 in which the pulsating heat applied is alternately supplied for approximately 6 seconds and terminated for approximately 3 seconds.

5. The method according to claim 4 in which the pulsating heat averages approximately 300 kilowatts.

6. An electric furnace for continuously melting and refining molten glass by the Joule effect comprising, in combination:
    a container for a molten glass mass;
    at least one thermal zone extending within the mass in the container in a direction transverse to the molten glass mass flow direction;
    an electric circuit means for defining the thermal zone which includes at least two electrodes for supplying electric power to the molten glass mass, the electrodes being located adjacent a glass exiting region of the container; and,
    a timing means operatively connected to the electric circuit means for pulsing the electrodes for controlling power to the electrodes at predetermined time intervals.

7. An electric furnace according to claim 6 which further includes a plurality of thermal zones extending within the molten glass mass, each of ther thermal zones extending in a direction transverse to the molten glass mass flow direction; and,
    wherein the pulsing electrodes located in the thermal zone adjacent the glass exiting region of the furnace to lower the overall energy supplied to the container.

8. An electric furnace according to claim 7 wherein the plurality of thermal zones defines a temperature gradient extending from a first region adjacent a glass batch material delivery region and terminating at an opposing region adjacent the molten glass mass exiting region.

9. The electric furnace according to claim 6 wherein the circuit means further includes a power source, and a means connecting the power source to the pair of electrodes, the circuit control means in series.

10. An electric furnace for continuously melting and refining molten glass by the Joule effect comprising, in combination:
    a container for the molten glass mass;
    a plurality of thermal zones extending within the molten glass mass, each of the thermal zones extending in a direction transverse to the direction of the molten glass mass flow, at least one thermal zone being located adjacent a region where the molten glass exits the container;
    electric circuit means for each of the thermal zones including electrodes for supplying electric power to the molten glass mass; and
    means for controlling power to at least two interconnected electrodes in the thermal zone adjacent the glass exiting region of the container at predetermined time intervals in order to establish a predetermined temperature profile within the molten glass mass.

* * * * *